(12) United States Patent
Fortmeier et al.

(10) Patent No.: US 12,703,022 B2
(45) Date of Patent: Aug. 11, 2026

(54) MOTOR VEHICLE COMPONENT AND METHOD FOR PRODUCING THE SAME

(71) Applicants: BENTELER AUTOMOBILTECHNIK GMBH, Paderborn (DE); Volkswagen AG, Wolfsburg (DE)

(72) Inventors: Guenter Fortmeier, Delbrueck (DE); Thomas Henksmeier, Wadersloh (DE); Norbert Niggemeyer, Paderborn (DE); Erik Schultz, Paderborn (DE)

(73) Assignees: BENTELER AUTOMOBILTECHNIK GMBH, Paderborn (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 18/912,595

(22) Filed: Oct. 11, 2024

(65) Prior Publication Data

US 2025/0121426 A1 Apr. 17, 2025

(30) Foreign Application Priority Data

Oct. 12, 2023 (EP) .................................... 23203268

(51) Int. Cl.
*B23K 37/00* (2025.01)
*B21D 53/88* (2006.01)
*B60G 21/05* (2006.01)

(52) U.S. Cl.
CPC .............. *B21D 53/88* (2013.01); *B23K 37/00* (2013.01); *B60G 21/051* (2013.01);
(Continued)

(58) Field of Classification Search
CPC ............ B23K 33/006; B23K 2101/006; B23K 2101/06; B23K 26/32; B23K 33/008;
(Continued)

(56) References Cited

U.S. PATENT DOCUMENTS 2,363,089 A * 11/1944 Scherl ...................... B23K 5/00 228/28
2,715,263 A * 8/1955 Macgregor ........ B23K 11/0873 228/223

(Continued)

FOREIGN PATENT DOCUMENTS

DE 102023114823 A1 12/2024
FR 2558926 A * 8/1985 ............ F16L 41/084

(Continued)

OTHER PUBLICATIONS

The Fabricator, https://www.thefabricator.com/thefabricator/article/cuttingweldprep/5-steps-for-proper-weld-preparation, Nov. 25, 2020 (Year: 2020).*

(Continued)

*Primary Examiner* — Erin B Saad
(74) *Attorney, Agent, or Firm* — HAUPTMAN HAM, LLP

(57) ABSTRACT

A motor vehicle component has two component parts made of steel with different wall thicknesses, which are arranged at an angle α to one another and are connected by a weld seam. A joining surface at the end portion of the first component part has a bevel produced without cutting. In order to form the bevel, an end portion of an initial blank is formed without cutting. The end portion is then trimmed at the end and an abutment surface is created on the front side of the end portion. The two component parts are positioned relative to each other so that the joining surface of the first component part and the joining surface of the second component part face each other. The material-locking joining of the first component part and the second component part is achieved by a weld seam on the joining surfaces.

5 Claims, 5 Drawing Sheets

(52) U.S. Cl.
CPC ...... *B60G 2200/21* (2013.01); *B60G 2206/72* (2013.01); *B60G 2206/8201* (2013.01)

(58) Field of Classification Search
CPC .............. B23K 2101/12; B23K 26/242; B23K 26/262; B23K 1/00; B23K 1/002; B23K 10/02; B23K 11/0873; B23K 11/0876; B23K 11/0935
See application file for complete search history.

(56) References Cited

U.S. PATENT DOCUMENTS

| | | | | | |
|---|---|---|---|---|---|
| 2,939,348 | A * | 6/1960 | Barnes | F16L 13/0281 | 285/289.1 |
| 3,135,047 | A * | 6/1964 | Houser | B23K 9/035 | 228/226 |
| 3,374,126 | A * | 3/1968 | Lingenfelter | C21D 1/74 | 29/422 |
| 3,400,449 | A * | 9/1968 | Szeligo | B23K 11/0876 | 228/172 |
| 3,563,713 | A * | 2/1971 | Rudd | B23K 20/085 | 228/232 |
| 4,833,295 | A * | 5/1989 | Locker | F16H 41/24 | 219/121.13 |
| 4,949,895 | A * | 8/1990 | Sugiyama | F16L 9/02 | 228/183 |
| 5,417,277 | A * | 5/1995 | Le Gauyer | F28F 9/0212 | 165/173 |
| 10,619,540 | B2 * | 4/2020 | Blueml | B23K 26/242 | |
| 2009/0206597 | A1 * | 8/2009 | Wecker | B23K 11/0935 | 285/288.2 |
| 2019/0292958 | A1 * | 9/2019 | Blueml | B01D 53/94 | |
| 2022/0226937 | A1 * | 7/2022 | Ganjvar | B01J 19/0053 | |
| 2023/0256532 | A1 * | 8/2023 | Crabbe | B23K 9/164 | 219/75 |
| 2024/0413440 | A1 | 12/2024 | Park et al. | | |

FOREIGN PATENT DOCUMENTS

| | | | |
|---|---|---|---|
| KR | 10-2024-0173850 | A | 12/2024 |
| WO | 2021171992 | A1 | 9/2021 |
| WO | 2024/238818 | A1 | 11/2024 |

OTHER PUBLICATIONS

FR-2558926-A computer English translation (Year: 2025).*

Wayken, https://waykenrm.com/blogs/what-is-a-bevel/, 2025 (Year: 2025).*

Extended European Search Report, EP Application No. 24192619.5, mailed Feb. 5, 2025, 16pp.

Arc weld joints archives—AHSS Guidelines, dated Jun. 29, 2022, WorldAutoSteel, XP093139166, 13pp.

Extended European Search Report, EP Application No. 23203268.0, mailed Apr. 23, 2024, 16pp.

* cited by examiner

MOTOR VEHICLE COMPONENT AND METHOD FOR PRODUCING THE SAME

RELATED APPLICATIONS

The present application claims priority of European Application Number 23203268.0 filed Oct. 12, 2023, the disclosure of which is hereby incorporated by reference herein in its entirety.

FIELD

The present disclosure relates to a motor vehicle component, and to a method for producing a welded motor vehicle component.

BACKGROUND

Welding is a design-determining manufacturing process for welded component parts and one of the most important and widely used joining processes, in automotive construction. Welding is the permanent, material-locking joining of component parts using heat and pressure with or without filler metals. In joint welding, the parts are joined together to form the welded component part by weld seams at the weld joint. Several welded component parts form a weld group and several weld groups form a welded construction.

By welding, the component parts or component part portions are joined together in such a way that they are able to meet the requirements placed on them over the expected service life. For this purpose, the weld joints are able to meet the required quality criteria and characteristics. These are closely linked to the respective component requirements in use. Adequate quality is able to be expected if irregularities in the weld seam that occur during or after welding is able to be tolerated for the use of the welded component.

The weld joint is the region where the welded parts are joined together. At the weld joint, the weld seam design and weld seam position have a decisive influence on the functionally relevant parameters of the weld seam, such as penetration. The penetration depth is the distance between the surface of the base material melted by welding and the original surface of the base material, i.e. the depth of the melted zone in the base material.

The penetration depth is closely related to the joint strength. The strength and quality of the weld seams are important for motor vehicle components that are subject to high stress during driving.

SUMMARY

The object of the present disclosure is to improve the load behavior of a motor vehicle component welded from at least two component parts and increasing its service life without adversely increasing the weight, as well as to provide a method for producing a welded motor vehicle component with an improved welding result.

A motor vehicle component according to the present disclosure has a first component part and a second component part. The two component parts are made of steel and are connected by welding by at least one weld seam. The first component part has a wall with a wall thickness and the second component part has a wall with a wall thickness. The first component part and the second component part each have a joining surface. The two component parts are arranged at an angle to each other and are connected by a weld seam on the joining surfaces facing each other.

According to the present disclosure, the joining surface at the end portion of the first component part has a bevel produced without cutting.

The end portion of the first component part receives a seam preparation optimized for weld joining. The joining surface is extended by the portion of the bevel. Due to the bevel in the joining surface of the end portion, the joining gap between the joining surface of the first component part and the joining surface on the second component part takes on a V-shaped configuration. The joining gap between the end portion of the first component part and the second component part is V-shaped. The bevel and the V-shaped joining gap ensure very good penetration in the first component part. The term penetration refers to the depth of the molten zone in the base material. In at least one embodiment, the present disclosure improves the penetration, for example, in the first component part. A component-optimized and process-related improved penetration is created in the first component part without causing a burn-through in the thinner wall of the second component part.

The present disclosure provides a motor vehicle component with a longer service life without increasing the component weight. The welded joint between the two component parts is highly stable and has an optimized static and dynamic load behavior.

The motor vehicle component according to the present disclosure is a chassis component such as axles, for example, a twist beam axle. In at least one embodiment of the present disclosure, a twist beam axle has a first component part in the form of a torsion profile and second component parts in the form of side arms or trailing arms.

Motor vehicle components of the type according to the present disclosure are able to be all welded constructions in which at least two component parts with different wall thicknesses are connected by a weld joint, for example, with a T-, L- or X-joint.

The wall of the first component part and the wall of the second component part are able to have the same wall thickness. The wall thicknesses of the first component part and the second component part are also able to differ from each other. The present disclosure is advantageous for motor vehicle components in which the first component part has a wall with a wall thickness that is greater than the wall thickness of a wall of the second component part. In at least one embodiment of the present disclosure, the first component part has a wall with a wall thickness that is smaller than the wall thickness of the wall of the second component part.

In at least one embodiment of the present disclosure, in the case of welded motor vehicle components made of component parts with different wall thicknesses, due to the difference in wall thickness, there are difficulties to achieve a high penetration of the weld seam into the thicker component part, i.e., the component part with the greater wall thickness, without causing burn-through in the component with the smaller wall thickness. The reduced penetration is able to lead to a reduction in the service life of the welded motor vehicle component.

The bevel and the V-shaped joining gap ensure a high level of penetration in the first component part, i.e., the component with the thicker or stronger wall.

The present disclosure provides a penetration of 2% to 10% with a flank penetration length of 70% to 90%. In at least one embodiment of the present disclosure, a penetration of up to 30% in a process-reliable manner is able to be achieved. Practical tests suggest that even higher penetration values are able to be expected, so that penetration is able to be increased to more than 50%.

Due to the bevel provided according to the present disclosure, welding filler material is able to be pushed between the component parts in the joining gap during welding, so that the root of the weld seam is shifted further or deeper into the joining gap. The result is a higher penetration.

The bevel is able to extend along the entire joint edge of a motor vehicle component. In at least one embodiment of the present disclosure, the bevel is provided in the regions of a joint edge in which the greatest loads from external forces occur. In the case of a torsion profile of a twist beam axle, the bevel is provided on the joining surfaces of the legs of the torsion profile. In the case of a torsion profile with a U- or V-shaped cross-section, the bevel is arranged on the inside of the torsion profile along the legs.

The bevel is also able to be provided only on a partial portion of the length of the joining surface at the end portion of the first component part. In at least one embodiment of the present disclosure, the bevel is formed starting from a free end of the wall of the first component part over a longitudinal portion of approximately 30% to 75%, approximately 50%, of the length of the wall of the first component part. In the case of a torsion profile with a U- or V-shaped cross-section, the bevel is able to be arranged on the inside of the cross-section on the inside of the torsion profile on the legs. Furthermore, the bevel is able to be arranged on the outside of the cross-section on the outside of the torsion profile along the legs.

The tangential length of the bevel is measured in the cross-section of the torsion profile in the direction of the circumference of the torsion profile and is able to extend over the entire circumferential length of the front side of the torsion profile. The tangential length of the bevel is also able to run only over the length of one leg or be provided on a partial portion of the length of a leg of a torsion profile The bevel runs at an angle to the longitudinal axis of the wall of the first component part. In at least one embodiment of the present disclosure, the angle is in a range between 25° and 60°. In at least one embodiment of the present disclosure, an angle in the range of 30° to 45° is also considered advantageous.

The joining surface of the first end portion has a front-side abutment surface. The abutment surface is located on the front side at the free end of the end portion. The abutment surface runs at right angles to the longitudinal axis of the wall of the torsion profile. The abutting surface of the first component part bluntly abuts against the second component part.

In at least one embodiment of the present disclosure, the abutment surface has a width measured at right angles to the longitudinal axis of the wall of the first component part, which is greater than the wall thickness of the wall of the first component part.

The bevel of the joining surface merges into the front side of the end portion. The abutment surface is connected to the bevel.

In at least one embodiment of the present disclosure, the bevel of the joining surface at the end portion of the first component part is produced without cutting. A controlled plastic deformation is carried out at the end portion of the first component part. The end portion is brought into the desired shape by applying an external force. This is done by bending or shear forming.

The method according to the present disclosure for producing a welded motor vehicle component, which has at least two component parts made of steel with different wall thicknesses, which are arranged at an angle to one another and connected by a weld seam, has the following steps:

- manufacturing a first component part with a joining surface which has a bevel and an abutment surface, wherefore
- an initial blank is provided which has a wall with a wall thickness and
- an end portion of the initial blank is formed and a bevel is formed at the end portion and
- the end portion is trimmed at the end and an abutment surface is created at the front of the end portion;
- providing a second component part which has a wall with a wall thickness and wherein the second component part has a joining surface;
- positioning the first component part and the second component part at an angle relative to each other such that the joining surface of the first component part and the joining surface of the second component part face each other;
- material-locking joining of the first component part and the second component part by means of a weld seam on the joining surfaces.

In at least one embodiment of the present disclosure, the end portion is shifted sideways, bent or deformed during forming. This is done, as already explained above, by bending or shear forming.

To produce the bevel at the end portion, the end portion of the initial blank is able to first be formed into an S-shape. The end portion is then trimmed and an end piece is separated from the free end of the end portion. The trimming is carried out at right angles to the longitudinal axis of the initial blank or the wall of the initial blank. During the trimming process, a slight chamfer is created, for example, on the side of the counterholder of the cutting tool. The trimming line therefore does not run in a straight line but has a slightly slanted chamfer or surface at the end of the cutting line.

The initial blank is able to be subjected to further forming before or after forming and trimming the end portion. During this forming step, the initial blank, at least in some regions, over its length, acquires a cross-sectional configuration of the first component part.

In at least one embodiment of the present disclosure, the end-side trimming of the end portion takes place at a transverse angle, for example, substantially at a right angle to the longitudinal axis of the wall of the initial blank.

In at least one embodiment of the present disclosure, the first component part and the second component part have different wall thicknesses from one another. In at least one embodiment of the present disclosure, the wall thickness of the second component part is, at least in some regions, smaller than the wall thickness of the first component part in the region of the joint connection. Accordingly, a second component part is provided which has a wall with a wall thickness which is different from the wall thickness of the wall of the first component part.

The present disclosure is described in more detail below with reference to drawings, as follows.

DETAILED DESCRIPTION

The forming process for producing a first component part 1 of a motor vehicle component 2 is explained with reference to FIG. 1A to FIG. 1D. The motor vehicle component 2 is shown in FIG. 2B.

Figure 1A:
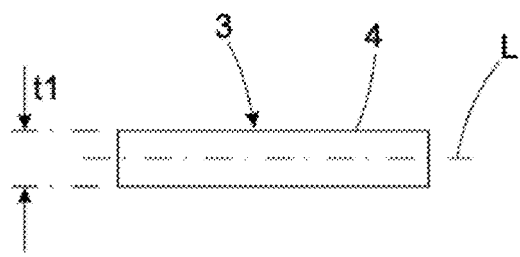
FIG. 1A to FIG. 1D show a technical schematic of the procedure for manufacturing a first component part with a joining surface which has a bevel and an abutment surface according to at least one of the embodiments.

FIG. 1A shows an initial blank 3. The initial blank 3 has a wall 4 with a wall thickness t1.

Figure 1B:
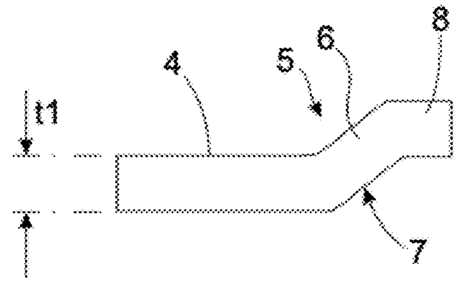

An end portion 5 of the initial blank 3 is formed without cutting. The end portion 5 is plastically deformed and configured in an S-shape. In this way, a leg 6 with a bevel 7 and an end piece 8 running parallel to the longitudinal axis L of the wall 4 of the initial blank 3 are created at the end portion 5. This is shown in FIG. 1B. The end piece 8 is displaced laterally parallel to the longitudinal axis L of the wall 4.

Figure 1C:
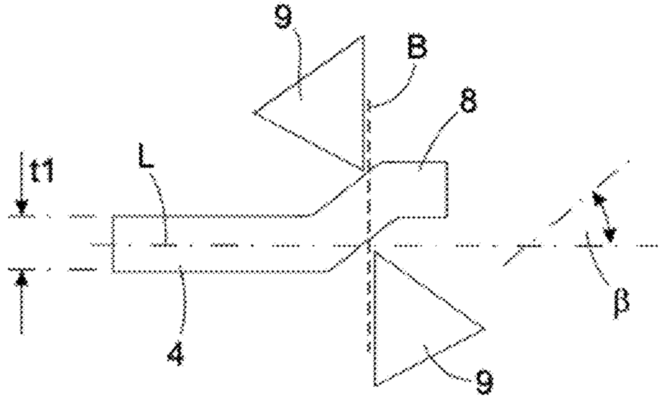

FIG. 1C illustrates the trimming operation at the end portion 5. At end portion 5, an end trimming is performed. The cutting tool is indicated by reference numeral 9. The trimming is carried out at an angle perpendicular to the longitudinal axis L of the wall 4 of the initial blank 3 along the trimming line B.

The trimming operation is carried out in the region of the leg 6 with the bevel 7. During trimming, the end piece 8 is removed. At the front end of the end portion 5, an abutment surface 10 is created which runs perpendicular to the longitudinal axis L.

Figure 1D:
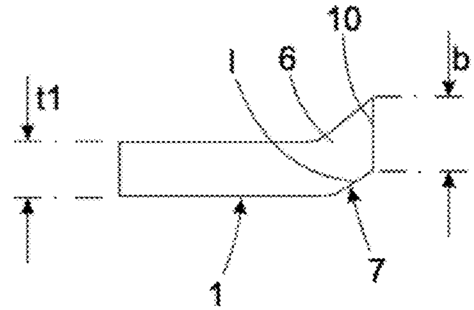

FIG. 1D shows the finished trimmed first component part 1.

The abutment surface 10 has a width b measured at right angles to the longitudinal axis L of the wall 4 of the first component part 1, which is greater than the wall thickness t1 of the wall 4 of the first component part 1. The ratio of the wall thickness t1 of the wall 4 of the first component part 1 to the width b of the abutment surface 10 is between 1:1.1 and 1:1.5.

The bevel 7 has an axial length l. The axial length l of the bevel 7 is measured in the direction of the longitudinal axis L of the wall 4 of the torsion profile 1. The axial length l is measured in the region of the later joining connection. The bevel 7 runs at an angle β from 25° to 60°, or from 30° to 45° to the longitudinal axis L of the wall 4 of the first component part 1. The ratio of the axial length l of the bevel 7 to the wall thickness t1 of the wall of the first component part 1 is between 1:1 and 1:5. The bevel 7 is located on the side of the end portion 5 of the first component part, which forms the acute angle β with the second component part 11.

To produce the motor vehicle component, a second component part 11 made of steel is provided. The second component part 11 has a wall 12 with a wall thickness t2. The wall thickness t1 of the wall 4 of the first component part 1 is greater than the wall thickness t2 of the wall 12 of the second component part 11.

The first component part 1 has a joining surface 13 at the end portion 5. The joining surface 13 comprises the bevel 7 and the front abutment surface 10.

The second component part 11 also has a joining surface 14.

Figure 2A:
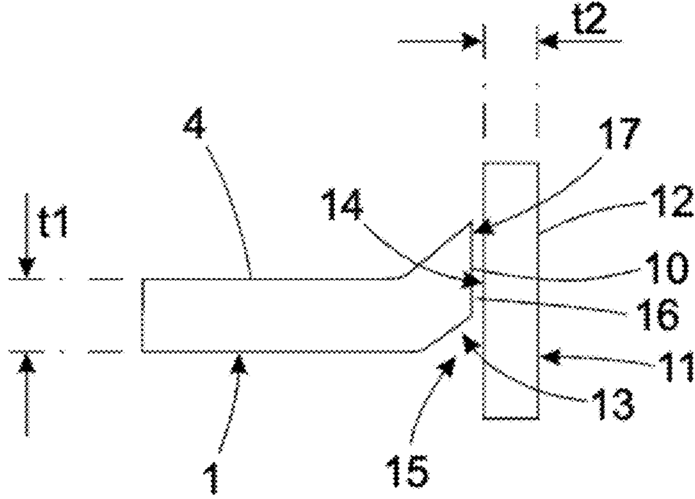
FIG. 2A shows a section of the wall of a first component part and a section of the wall of a second component part before welding according to at least one of the embodiments.
Figure 2B:
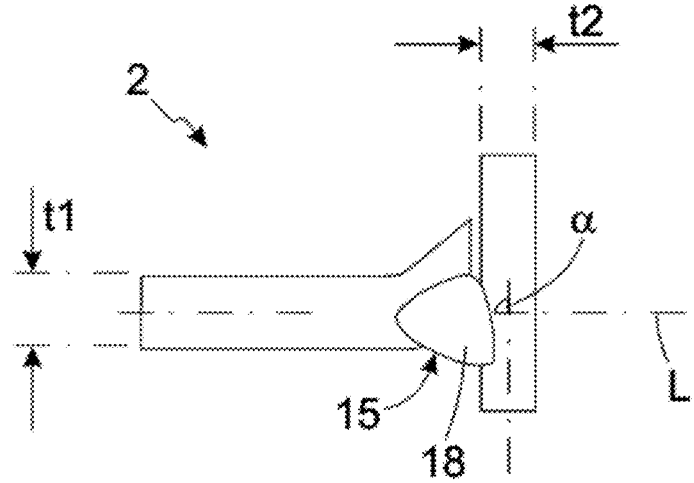
FIG. 2B shows the component parts according to the representation in FIG. 2A after welding according to at least one of the embodiments.

The first component part 1 and the second component part 11 are materially joined together by a welded joint. To produce the welded joint, the first component part 1 and the second component part 11 are positioned relative to each other. This is shown in FIG. 2A. The first component part 1 and the second component part 11 are arranged at an angle α to each other, for example, the first component part 1 abuts the second component part 11 obtusely at a right angle α with a T-joint.

The joining surface 13 of the first component part 1 and the joining surface 14 of the second component part 11 face each other. The abutment surface 10 runs at right angles to the longitudinal axis L of the wall 4 of the first component part 1. The abutment surface 10 is oriented parallel to the joining surface 14 of the second component part 11. A V-shaped joining gap 15 is formed between the joining surface 13 of the first component part 1 and the joining surface 14 of the second component part 11. At the deepest point of the V-shaped joining gap 15 there is a gap portion 16 formed parallel between the abutting surface 10 and the joining surface 14 of the second component part 11. The bevel 7 runs at an acute angle relative to the front side 17. The bevel 7 ends at the front side 17. The abutting surface 10 adjoins the bevel 7 at an obtuse angle.

The material-locking joint connection is made via a weld seam 18, as shown in FIG. 2B. The bevel 7 and the V-shaped joining gap 15 make the weld seam 18 efficient, wherein a high penetration is achieved in the first component part 1.

The seam preparation and the forming of the bevel 7 in the joining surface 13 on the first component part 1 as well as the V-shaped configuration of the joining gap 15 create a welded connection between the first component part 1 and the second component part 11 with a quality and service life that meets the requirements. The penetration of the weld seam 18 on the first component part 1 is able to be increased without causing burn-through on the second component part 11. The weld seam 18 meets the highest strength requirements, whereby the overall service life of the motor vehicle component 2 is able to be increased without increasing its overall weight.

The motor vehicle component 2 is able to be a twist beam axle. In the twist beam axle, a first component part 1 in the form of a torsion profile is joined by welding at each end to a second component part 11 in the form of a side arm.

Figure 3:
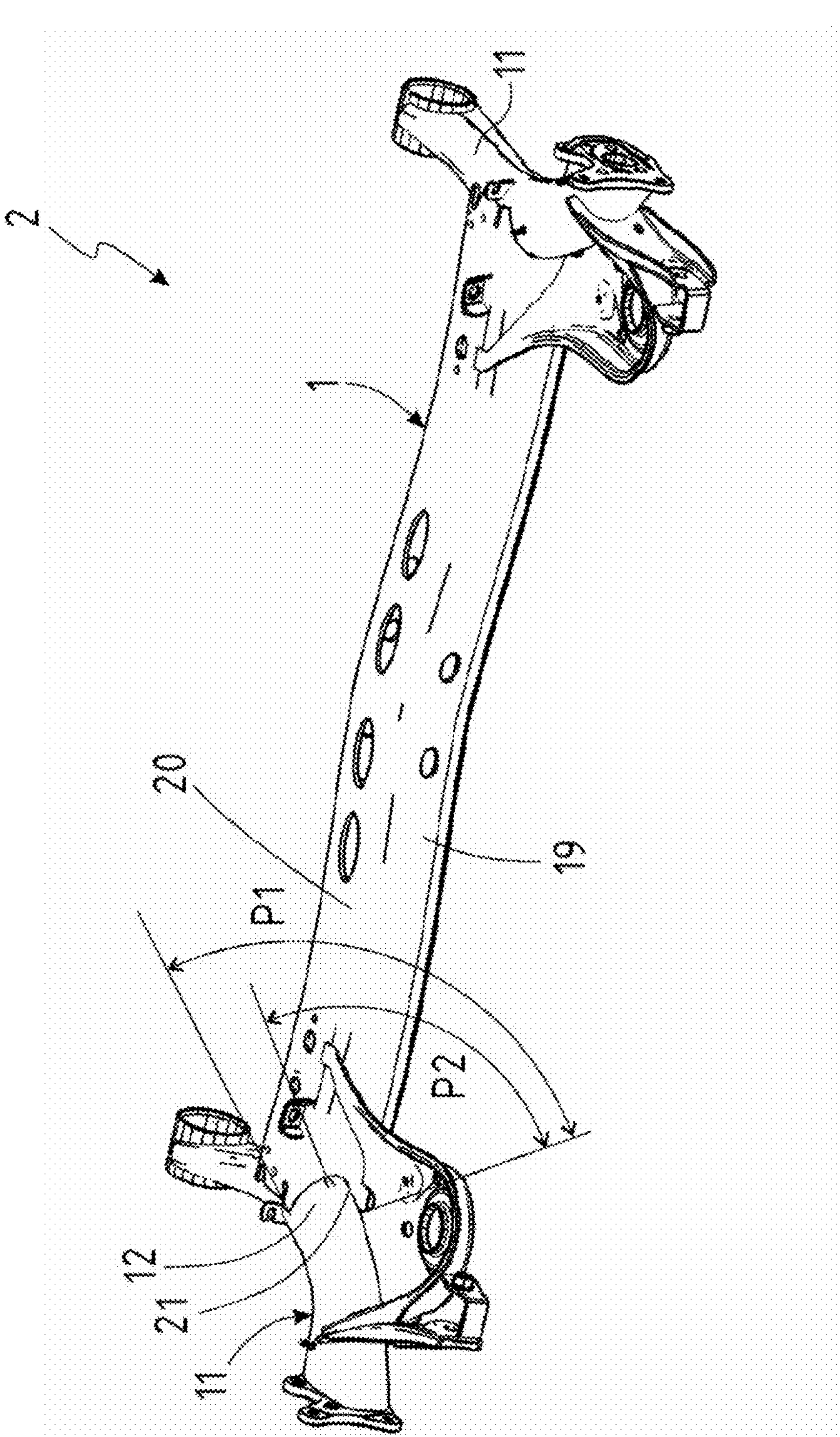
FIG. 3 shows a twist beam axle in a perspective view according to at least one of the embodiments.

FIG. 3 shows a motor vehicle component 2 in the form of a twist beam axle with a first component part 1, which is the torsion profile, and second component parts 11, each of which is a side arm of the twist beam axle. The torsion profile has a wall 4 with a wall thickness t1. Each side arm has a wall 12 with a wall thickness t2. The wall thickness t1 of wall 4 of the torsion profile is able to be greater than the wall thickness t2 of a side arm. Please refer to the explanations regarding the representations in FIG. 1 and FIG. 2. The torsion profile has a U-shaped cross-section with two side legs 19 which are connected via a crest portion 20. The torsion profile abuts with the end portion 5 the wall 12 of a side arm. The joining surface 13 at the end portion 5 of the torsion profile is adapted to the outer contour of the wall 12 of the side arm.

The arrow P1 schematically shows the length of a side leg 19 with which the end portion 5 of the first component part 1 or of the torsion profile abuts the outer circumference of a side arm. This is approximately 180°+/−15° based on the circumference of the side arm, which has a round cross-section.

The arrow P2 indicates the length of a longitudinal portion 21 of the first component part 1 or of a side leg 19, in which the bevel 7 is provided on the inner side of the side leg 19. The bevel 7 is provided in the lower longitudinal portion 21 of the side leg 19. In at least one embodiment of the present disclosure, the bevel 7 extends over two thirds, for example, approximately half the length of a side leg 19. Relative to the cross-section of a side arm, the bevel 7 extends over a circumferential portion of approximately 90°+/−15°. The bevel 7 is provided in the lower longitudinal portion 21 of a side leg 19, starting from the free leg end.

Figure 4:
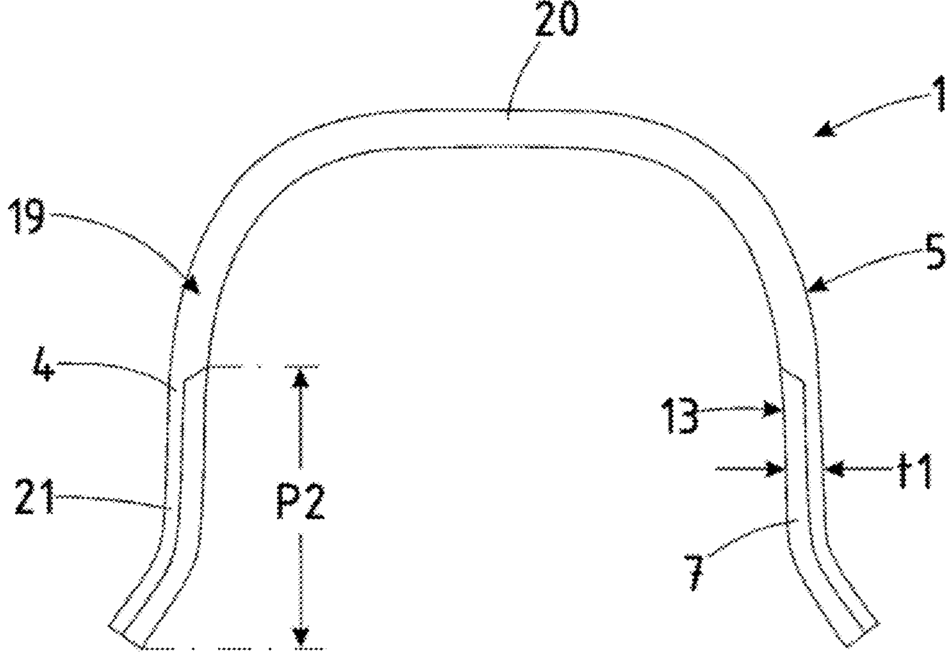
FIG. 4 is a view of the front side of the end portion of a torsion profile of a twist beam axle according to at least one of the embodiments.

FIG. 4 shows a front view of the joining surface 13 at an end portion 5 of a first component part 1 in the form of a torsion profile. The torsion profile has a wall 4 with a wall thickness t1. A bevel 7 produced according to the present disclosure is provided in the joining surface 13 at the end portion 5 of the torsion profile. The bevel 7 runs on the inside of the side legs 19 of the torsion profile.

The bevel 7 is provided in the lower longitudinal portion 21 of the side leg 19 starting from the free leg end. The tangential length of the longitudinal portion 21 is indicated by the arrow P2. In the illustrated exemplary embodiment, the bevel 7 extends approximately over half the length of a side leg 19.

Figure 5:
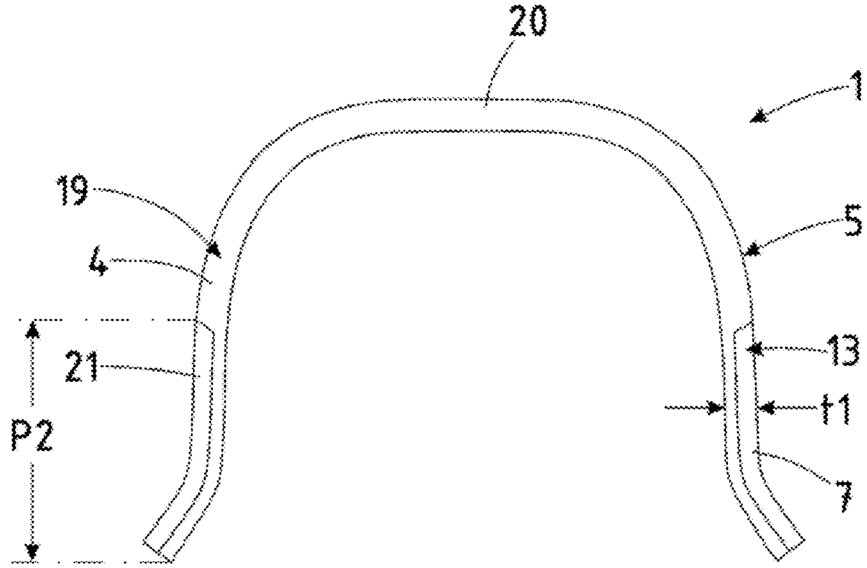
FIG. 5 is a view of the front side of the end portion of another embodiment of a torsion profile according to at least one of the embodiments.

FIG. 5 shows a front view of the joining surface 13 in an alternative embodiment at the end portion 5 of a torsion profile 1. Unlike the embodiment according to FIG. 4, here the bevel 7 is arranged on the outside of the side legs 19 of the torsion profile. As with the other embodiments, the bevel 7 is produced by machining. The bevel 7 extends in a lower longitudinal portion 21 of each side leg 19 originating from the free leg end. Otherwise, the embodiment corresponds to that of FIG. 4 and the associated description.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A method of making a welded motor vehicle component, the method comprising:

manufacturing a first component part with a joining surface, the joining surface having a bevel and an abutment surface;

forming an end portion of the first component part having a wall with a wall thickness, and forming a bevel on the end portion, the first component part having two bends to form a slanted portion;

trimming the end portion to separate an end piece from the end portion to form the abutment surface on a front side of the end portion;

positioning the first component part and a second component part, which has a wall with a wall thickness and a joining surface, at an angle relative to one another, so the joining surface of the first component part and the joining surface of the second component part face one another; and material-locking joining the first component part and the second component part by a weld seam at the respective joining surfaces.

2. The method according to claim 1, wherein the end portion is laterally displaced, bent, or embossed during the forming.

3. The method according to claim 1, wherein the first component part is subjected to a further forming before or after the forming and the trimming of the end portion.

4. The method according to claim 1, wherein the trimming of the end portion is at an angle perpendicular to a longitudinal axis of the wall of the first component part.

5. The method according to claim 1, wherein the wall thickness of the wall of the second component part is smaller than the wall thickness of the wall of the first component part.

* * * * *